United States Patent
Acke et al.

(10) Patent No.: US 8,111,631 B2
(45) Date of Patent: Feb. 7, 2012

(54) SYSTEMS AND METHODS FOR AUTOMATIC CONFIGURATION OF CUSTOMER PREMISES EQUIPMENTS

(75) Inventors: Willem Acke, Rijmenam (BE); Christoph Stevens, Stekene (BE); Pascal Justen, Brussels (BE); Werner Liekens, Sint-Katelijne-Waver (BE); Jan Coppens, Ghent (BE); Christele Bouchat, Antwerp (BE)

(73) Assignee: Alcatel Lucent, Paris (FR)

( * ) Notice: Subject to any disclaimer, the term of this patent is extended or adjusted under 35 U.S.C. 154(b) by 142 days.

(21) Appl. No.: 12/379,507

(22) Filed: Feb. 24, 2009

(65) Prior Publication Data
US 2009/0219820 A1    Sep. 3, 2009

(30) Foreign Application Priority Data
Feb. 28, 2008  (EP) .................................... 08290199

(51) Int. Cl.
*H04L 12/28* (2006.01)
(52) U.S. Cl. ....................................................... 370/254
(58) Field of Classification Search .................. 370/241, 370/254; 709/220–229
See application file for complete search history.

(56) References Cited

U.S. PATENT DOCUMENTS

| 2004/0268357 A1 | 12/2004 | Joy et al. | |
| 2006/0120305 A1* | 6/2006 | Van Den Bosch et al. | ... 370/254 |
| 2008/0133717 A1* | 6/2008 | Bouchat et al. | ........... 709/220 |

FOREIGN PATENT DOCUMENTS
EP          1 667 359          6/2006

OTHER PUBLICATIONS

J.R. Turner et al., "Model for Auto-Provisioning CPE", IETF Standard-Working-Draft, Internet Engineering Task Force, Oct. 22, 1999, pp. 1-29, XP015036329.
"TR-069 CPE WAN Management Protocol", Issue 1, Amendment 2, Broadband Forum, Dec. 2007, pp. 1-138, XP002493850.

* cited by examiner

*Primary Examiner* — Derrick Ferris
*Assistant Examiner* — Mang Yeung
(74) *Attorney, Agent, or Firm* — Harness, Dickey & Pierce

(57) ABSTRACT

A system for automatically configuring a device which is compatible with the Technical Report TR-069 of the DSL Forum, said system comprising a first automatic configuration server compatible with the Technical Report TR-069 of the DSL Forum, which is adapted and arranged for communicating with said device and for automatically configuring at least part of the configurable parameters of said device, said device by means of the CPE WAN Management Protocol defined in Technical Report TR-069 of the DSL Forum, wherein said system further comprises a proxy server arranged between said device and said automatic configuration server.

13 Claims, 4 Drawing Sheets

SYSTEMS AND METHODS FOR AUTOMATIC CONFIGURATION OF CUSTOMER PREMISES EQUIPMENTS

TECHNICAL FIELD OF THE INVENTION

The present invention relates to the field of systems, devices and method for automatic configuration of customer premises equipment.

BACKGROUND OF THE INVENTION

The DSL Forum DSL Forum is an international industry consortium of service providers, equipment and component manufacturers and other interested parties, focussing on developing of broadband DSL. The DSL Forum develops technical specifications and indirectly standards that enable delivery of DSL products and services. More information about the DSL Forum is available from its internet site http://www.dslforum.org.

One of those technical reports is the DSL forum's Technical report TR-069 (e.g. issue 1, amendment 2, dating from December 2007 [also referred to as v1.1 for the purpose of this description]], specifying the CPE WAN Management Protocol (also referred to as CWMP or TR-069). The TR-069 Management Protocol and corresponding network architectures allow communication between a Customer Premises Equipment (CPE) and an automatic configuration server (ACS). It defines a mechanism that encompasses secure auto-configuration of a CPE, and also incorporates other CPE management functions into a common framework.

Apart from the management protocol, DSL Forum also defines in technical report TR-098 the data model to be used for configuration of an Internet Gateway Device (routing gateway). Other DslForum standards define data models for other types of home devices (e.g. TR-104 for Voice over IP CPE, TR-140 for Storage Service Enabled Devices, etc).

Currently, TR-069 only supports management of a CPE by one management server (ACS) at the time. At any time, a CPE is aware of exactly one ACS with which it can connect. [see for instance paragraph 1.5 "Assumptions" of TR-069 (e.g. issue 1, amendment 2, dating from December 2007)].

When the management of the CPE has to be switched to another ACS, a parameter needs to be changed by the initial ACS (e.g. the URL of the ACS) on the CPE, so that the CPE is informed about which management server it has to connect to next.

In the case where different parts of the data model of the CPE are managed by different ACS's, the state of the art method assumes synchronization between the different ACS; the currently managing ACS needs the information on when to change the ACS-URL-parameter on the CPE to pass the management to the next ACS (called switch-over). In another view, the first ACS needs to know when the second ACS has to perform actions on the CPE.

Currently, there is no such standard interface defined between ACS's. Moreover, cases in which more than two ACS's have to provide part of the data model may become difficult to manage.

Furthermore, for the above mentioned system, comprising such a inter-ACS interface, to be commercially useful for multi-ACS CPE management, this interface would have to be standardized, which is not evident.

Furthermore there would be other technical problems associated with such a system, relating to the management of different parts of the object tree by different ACSs. For instance, it would be impossible to support a number of essential TR-069 specific features. Some of those are;

Passive and active notifications (indicating the change of a certain parameter-value in the object tree) are only sent once. Since each ACS wants to manage his own part of the object tree, the active notifications have to end up on the correct ACS. When using the current switch-over mechanism, it is impossible to control to which ACS notifications are to be sent.

Connection requests: in TR-069 a mechanism is defined in which an ACS can request the CPE to set up a session. The CPE can authenticate the ACS, before starting the session. Currently, the CPE only supports authentication of one ACS, and thus it is not possible to authenticate multiple ACS's connection requests.

Given these and other problems, it is today not possible to apply the current approach, as defined in TR-069, issue 1, amendment 2, of December 2007 and earlier versions, for multi-ACS CPE management.

SUMMARY OF THE INVENTION

It is an object of the present invention to provide a system for automatically configuring a device which is compatible with the Technical Report TR-069 of the DSL Forum, said system comprising a first automatic configuration server compatible with the Technical Report TR-069 of the DSL Forum, which is adapted and arranged for communicating with said device and for automatically configuring at least part of the configurable parameters of said device by means of the CPE WAN Management Protocol defined in Technical Report TR-069 of the DSL Forum, which solves the above mentioned problems of the prior art.

To reach this object the system according to the invention further comprises a proxy server or proxy functionality arranged between said device and said automatic configuration server.

The proxy server is preferably a TR-069 compliant ACS, which services the requests of its TR-069 clients by forwarding their requests to other ACS's. Towards its clients, the proxy server acts like an TR-069 server. Towards the other ACS's, the proxy server acts like a TR-069 client.

The systems claimed provide the advantage that the management of different parts of the object tree by different ACS's is enabled, without requiring changes to the TR-069 client or servers. In another view the pre-existing CPE's and ACS's compliant with TR-069 issue 1, amendment 2, December 2007 can be used in such systems without the need of further modifications.

Moreover, active and passive notifications as defined in TR-069 v1.1 and earlier versions are supported.

Moreover connection requests as defined in TR-069 v1.1 and earlier versions, originated by multiple ACS's are supported.

When terms as "first", "second", "third" and the like are used, this does not necessarily mean that a sequential or that a chronological order is to be assumed.

The term "comprising", should be interpreted as such that it does not exclude other elements or steps.

In embodiments of the present invention a remote management protocol (RMP) is used, which is the CPE WAN management protocol (CWMP) defined by the DSL forum's Technical report TR-069 (e.g. version V1.1 dating from December 2007, which is hereby incorporated by reference), but also including earlier or future versions comprising the relevant functionalities, as would be recognised by the person of ordinary skill. This protocol is hereafter also referred to as TR-069.

The TR-069 protocol is a protocol for communication between a Customer Premises Equipment (CPE) and an auto (or automatic) configuration server (further also referred to as ACS).

For the purpose of the present invention, the following terminology has been used, corresponding, unless mentioned otherwise, with the terminology of the TR-069 specification. The term "Device" is used in its ordinary sense and not as in TR-069. The CPE is TR-069 can thus be seen as an example of a device for the purpose of the present description.

ACS: Auto-Configuration Server: this is a component in the broadband network responsible for auto-configuration of the CPE for advanced services.

[It is to be noted that a collection of ACSs behind a load balancer is considered a single ACS for the purposes of this application.]

CPE: Customer Premises Equipment; the device present at the customer premises. It preferably refers to any TR-069-compliant device and therefore covers both Internet Gateway Devices and LAN-side end devices.

CWMP: CPE WAN Management Protocol (the subject of the standard TR-069)."

Data Model: a hierarchical set of Parameters that define the managed objects accessible via TR-069 for a particular device or service.

Internet Gateway Device: a CPE device, typically a broadband router, that acts as a gateway between the WAN and the LAN.

Parameter: a manageable CPE parameter made accessible to an ACS for reading and/or writing. It is typically represented by a name-value pair.

STB Set Top Box. This device contains Audio and Video decoders and is can be connected to Analog TV and/or Home Theaters.

Further aspects of the present invention are described by the dependent claims. The features from the dependent claims, features of any of the independent claims and any features of other dependent claims may be combined as considered appropriate by the person of ordinary skill, and not only in the particular combinations as defined by the claims.

According to preferred embodiments of the present invention the system further comprises a second automatic configuration server compatible with the Technical Report TR-069 of the DSL Forum, the second configuration server being adapted and arranged for communicating with the device and for automatically configuring at least part of the configurable parameters of the device and which is arranged such that the proxy server is in between the device and the second automatic configuration server.

According to embodiments of the present invention the proxy server is adapted for monitoring TR-069 sessions for the CPE, hereby acquiring session information.

This session information can for instance comprise or consist of the TR-069 parameters that are comprised in the parameterlist argument of the upstream Inform RPC (Remote Procedure Call) messages. The parameterlist contains parameters for which active of passive notification has been requested.

Another type of session information can be the DeviceId structure in the upstream Inform RPC message, containing information on the type of device.

Another type of information can be the presence of vendor specific RPC methods.

According to embodiments of the present invention, the proxy server is adapted for communicating with a plurality of at least 2 ACS's in function of a predetermined set of rules and based on the TR-069 session information.

For example, based on which parameters are contained in the parameterlist argument of the Inform RPC message, a rule could decide to which ACS or ACS's the message would have to be forwarded.

Another type of rule could make a decision on the type of device to decide to which ACS the information has to be forwarded.

Another type of rule could make a decision on forwarding to a certain ACS, based on the presence of vendor specific RPC methods in the session.

According to embodiments of the present invention, the proxy server is adapted for communicating with predetermined ACS's in order to manage respective predetermined parts of the data model of the device.

For example: consider a client device, which offers access via TR-069 to the standardized data model as defined in TR-098, which is hereby incorporated by reference, as well as vendor specific extensions for application management. One ACS could only handle the standardized data model as defined in TR-098, while another ACS may manage the vendor specific part. The proxy is then preferably configured with a set of rules to check on the parameters notified by the client, to compare them with a kind of template, and to, based on the outcome of the comparison, forward them to the correct ACS. It is noted that for this example: TR-098 defines that: 'The name of a vendor-specific parameter or object not contained within another vendor-specific object MUST have the form: X_<VENDOR>_VendorSpecificName'. The rule could check whether the parameternames in the parameterlist start with 'X_'. If so, this would trigger the setup of a session, and forwarding of the parameters to the second ACS.

A proxy server which can be used in embodiments of the present invention is disclosed in a further aspect of the present invention. It is to be noted that features and advantages explained for the systems according to the present invention, also apply to the proxy server, and further also to the use of the systems and methods according to further aspects of the present invention, as a person of ordinary skill would recognise.

A proxy server is disclosed, adapted for being placed in between a TR-069 session between a device and at least one automatic configuration server which are both compatible with Technical Report TR-069 of the DSL Forum, wherein the proxy server is adapted for monitoring TR-069 sessions from the device, hereby acquiring session information.

According to embodiments of the present invention the proxy server is further adapted for communicating with a plurality of at least 2 ACS's in function of a predetermined set of rules and based on the TR-069 session information.

Based on knowledge of which ACS handles which part of the data model, rules can be created that extract the proper information out of the session, compare it with certain wildcard based patterns, and trigger the forwarding to a certain ACS based on the outcome of the comparison. The proxy server is preferably configured with such a set of rules.

According to embodiments of the present invention the proxy server is adapted for communicating with predetermined ACS's in order to manage respective predetermined parts of the data model of the device.

In a further aspect of the present invention, the use of a system according to claim 1 for the automatic configuration of a device compatible with the Technical Report TR-069 of the DSL Forum is disclosed.

In a further aspect of the present invention, a method for automatically configuring a device compatible with the Technical Report TR-069 of the DSL Forum is disclosed, wherein the data model of the device is managed by a plurality of at least two automatic configuration servers all compatible with the Technical Report TR-069 of the DSL Forum, comprising;
setting up subsequent TR-069 sessions between the device and each of the plurality of automatic configuration servers, each session automatically configuring a predetermined part of the data model of the device;
monitoring each of the plurality of TR-069 sessions at a location external to the device, hereby acquiring session information;
directing each of the plurality of TR-069 sessions to a predetermined corresponding automatic configuration server of the multitude of configuration servers based on at least the session information.

According to embodiments of the present invention, directing is further based on a predetermined set of rules.

A proxy server or functionality will typically reside in the access provider's network. There it will typically proxy to ACS's that can be located in his own network, or externally (e.g. in a company providing and managing one specific application).

In another embodiment, it could be located in a home gateway, where it proxies for TR-069 sessions of different devices in the home network (e.g. voice over IP phones, NAS devices, set-top boxes, etc.). This way, the home gateway could use the session information for local decisions (e.g. Quality of Service (Qos) optimization) or Diagnostics, before forwarding the sessions. The proxy is typically external to the TR-069 client device.

In a certain view, the proxy initiates a session to the appropriate ACS, but uses the information of the initial session to communicate with this ACS (e.g. forwards the RPC methods from the session with the client over this new session with the ACS).

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

While some embodiments described herein include some but not other features included in other embodiments, combinations of features of different embodiments are meant to be within the scope of the invention, and form different embodiments, as would be understood by the skilled person.

According to embodiments of the present invention a proxy function [for instance residing in a proxy server (illustrated in FIG. 3)] is placed in between the communication path between the device (e.g. CPEs) and one or more ACSs, which are all TR-069 compliant.

Figure 3:
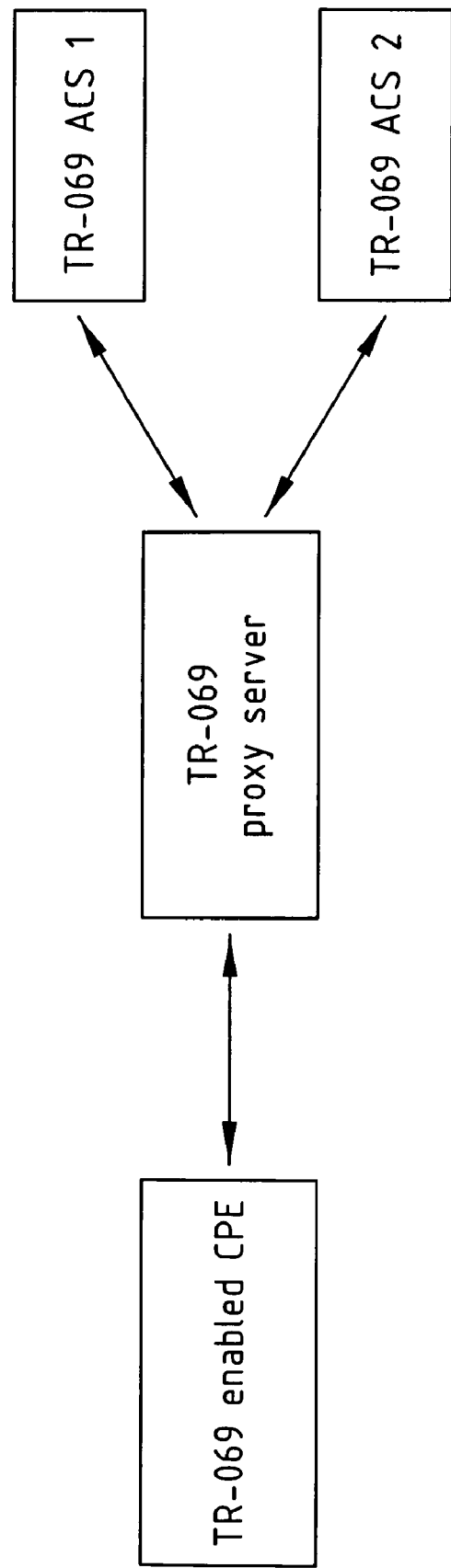
FIG. 3 illustrates embodiments of the present invention.

According to embodiments of the present invention, illustrated in FIG. 3, the HTTP(S) session associated with the CPE is terminated on the proxy server or function. The proxy subsequently sets up an HTTP session to the appropriate ACS. The TR-069 session is forwarded by the proxy to the appropriate ACS. Connection requests coming from the ACS(s) can also be forwarded or proxied towards the CPE.

Figure 1:
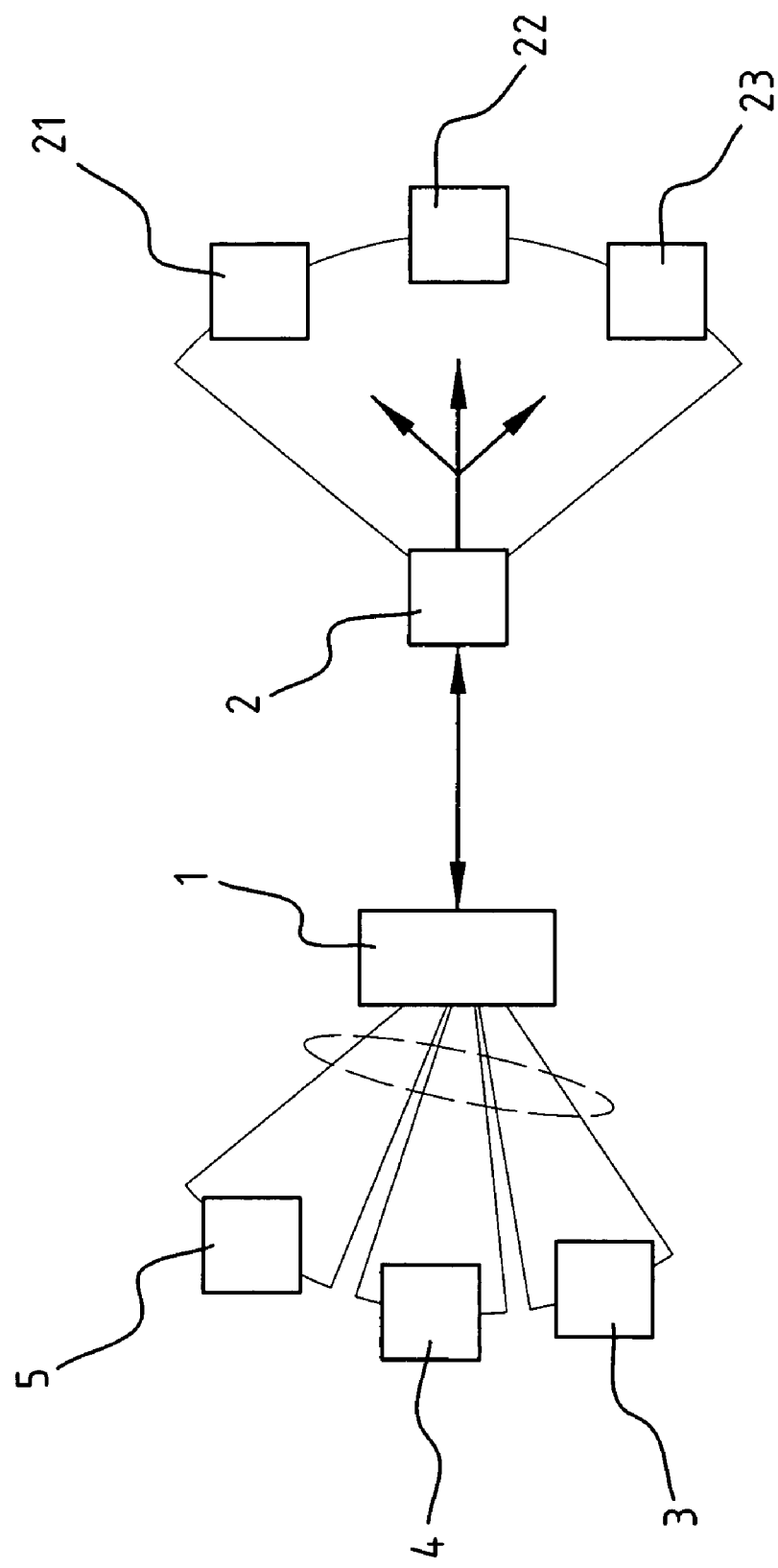
FIG. 1 shows a system according to the prior art, as disclosed in the Technical Report TR-069 of the DLS Forum of December 2007, v1.1.

FIG. 1 illustrates embodiments according to the state of the art as described by TR-069 technical report of the DSL Forum (version of December 2007 v1.1) The figure shows an auto configuration server (ACS) (1) and a customer premises equipment (2), which are communicating with each other. The client premises equipment can be a managed internet gateway device which is then further communicating with managed LAN devices (21, 22, 23) as for instance mobile phones (21), Set Top Boxes (22) etc. The auto configuration server itself can be in further communication with for instance but not only a call center (3), a policy implementation means (4) or an operation support system (OSS) (5). Limitations and problems of this system have been described in the summary chapter of the present application.

Figure 2:
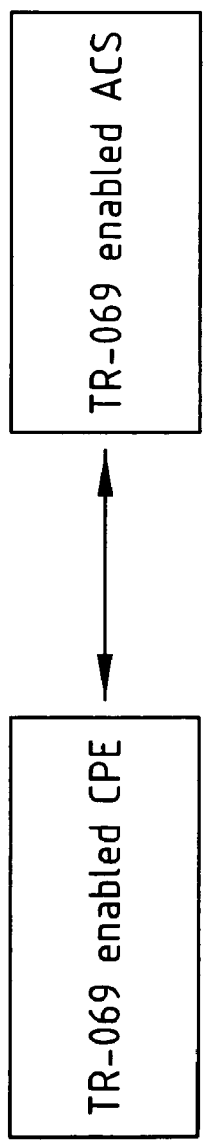
FIG. 2 illustrates the problem of the system depicted in FIG. 1, namely that a CPE can communicate with only one ACS.

FIG. 2 is an illustration of the state of the art systems, in which a TR-069 enabled customer premises equipment communicates with a TR-069 enabled automatic configuration server. It illustrates the prior art situation in which at any time a CPE is only aware of exactly one automatic configuration server with which it can connect. It may occur that different parts of the data model of the CPE are managed by different automatic configuration servers. This means that the first automatic configuration server needs to know when the second automatic configuration server has to perform actions on the CPE. An automatic configuration server interface between for instance two automatic configuration servers does not exist today. Moreover, such an interface is preferably to be standardized, which is not evident. Different other technical problems could be associated with such a system as has been described above. For instance it would be impossible to support a number of essential TR-069 specific features. According to the current definition of the architecture in technical report TR-069, passive and active notifications are only sent once, such it is impossible to control to which automatic configuration server the notifications are to be sent. Another example are connection requests: in TR-069 it is defined how a client premises equipment can set up a TR-069 session with an automatic configuration server. A step of authentication forms part of that process or may form part of that process. Today only one authentication for one automatic configuration server is foreseen in the specification TR-069, such that the authentication of multiple ACS's is not possible. This one to one mapping between CPE and ACS is illustrated by FIG. 2.

FIG. 3 shows a standard TR-069 compliant client or device. This device is configured with an IP address or host name of the proxy as ACS URL. In the preferred embodiments according to the present invention the HTTP or HTTP(S) session, underlying the TR-069 session is terminated on the proxy. The proxy then sets up HTTP sessions to the appropriate ACS's. The proxy acts as a TR-069 client towards both or all ACS's involved. It is considered to be an advantage of the present invention that both ACS's are standard TR-069 compatible ACS's, as defined by technical specification TR-069 of December 2007 version 1.1. Also the client premises equipment or device can be a standard client premises equipment or device as defined by technical report TR-069 of December 2007 version 1.1 and any earlier versions, as would be recognized by the person of ordinary skill.

Figure 4:
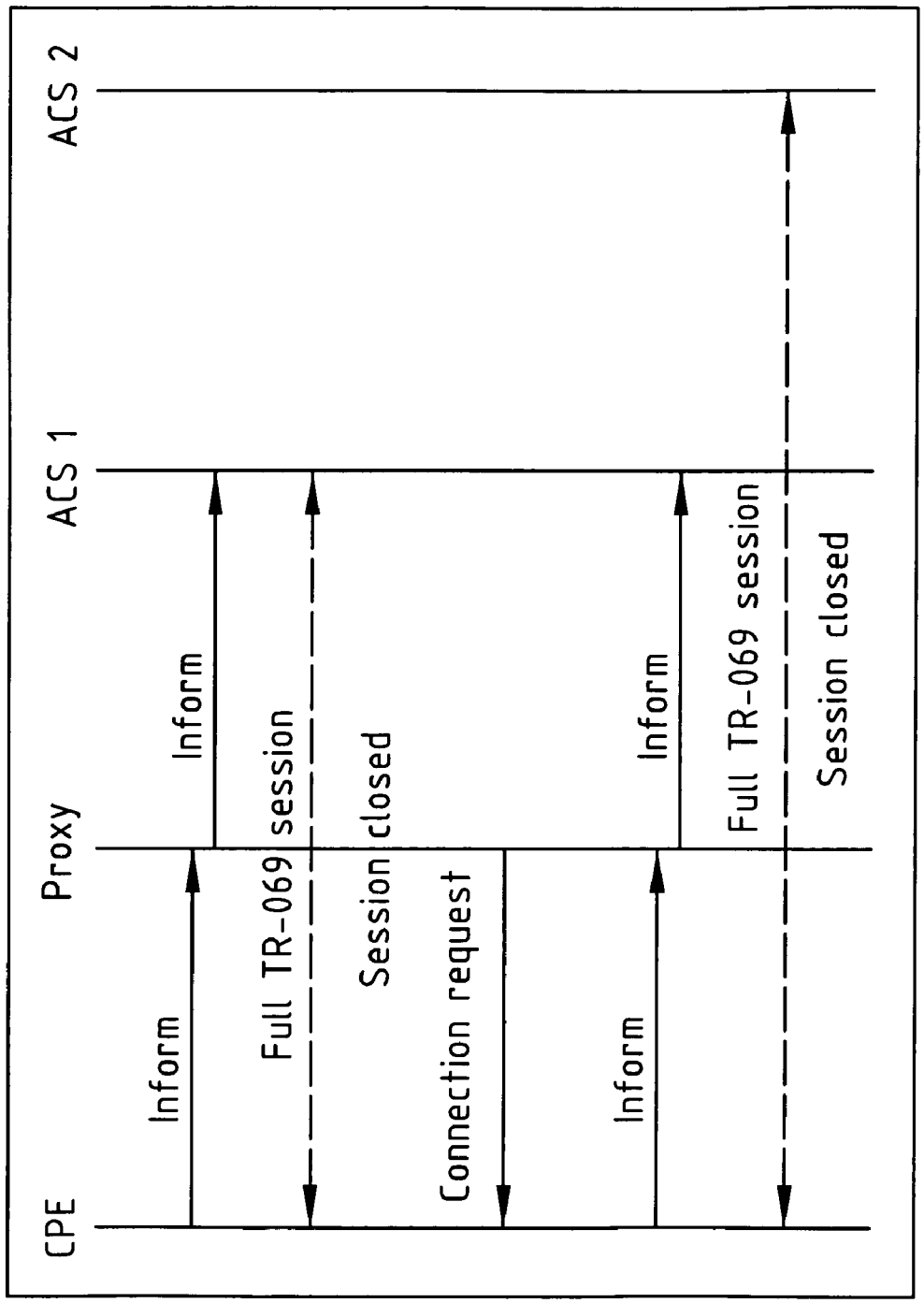
FIG. 4 illustrates elements of the call flow between CPE, proxy, a first ACS and a second ACS according to embodiments of the present invention, relating to the "Standard Inform" scenario as explained in TR-069 v1.1 and possibly earlier versions as would be recognised by the person of ordinary skill.

According to preferred embodiments of the present invention the proxy operation can be as follows. FIG. 4 illustrates the call flow between a CPE, the proxy, the first ACS (ACS 1) and the second ACS (ACS 2). The call flow according to embodiments of the present invention relating to the "standard inform" (boot, periodic, . . . ) scenario, as defined by technical report TR-069, without parameter change notification, can be the following: the CPE customer premises equipment initiates the TR-069 session to the proxy. The proxy forwards the session to the first ACS and keeps monitoring the session.

[An example for such monitoring can be as follows: during a session, an ACS could call the GetParameterNames RPC on the CPE, where the ParameterPath requested may contain objects and parameters that are unknown to him (since they would be managed by another ACS). The proxy should monitor the session for this RPC: when it detects this RPC being called by an ACS, it should monitor the session for the associated answer from the CPE. Based on rules configured in the proxy, it would remove the part of the parameter names that are unknown to the requesting ACS. This way, the proxy can ensure that a given ACS will only see parameters that are known and managed by it. Similar action may be required for the GetParameterValues and GetParameterNames RPC calls.]

After this first TR-069 session is closed, the proxy sends a connection request to the CPE. As a result the CPE restarts a second session to the proxy. Now the proxy forwards the session to the next ACS, for example ACS 2. If there are more than two ACS's involved, the proxy may repeat this procedure requesting a connection and may repeat forwarding the session to the next ACS (ACS 3, ACS 4, . . . ).

Figure 5:
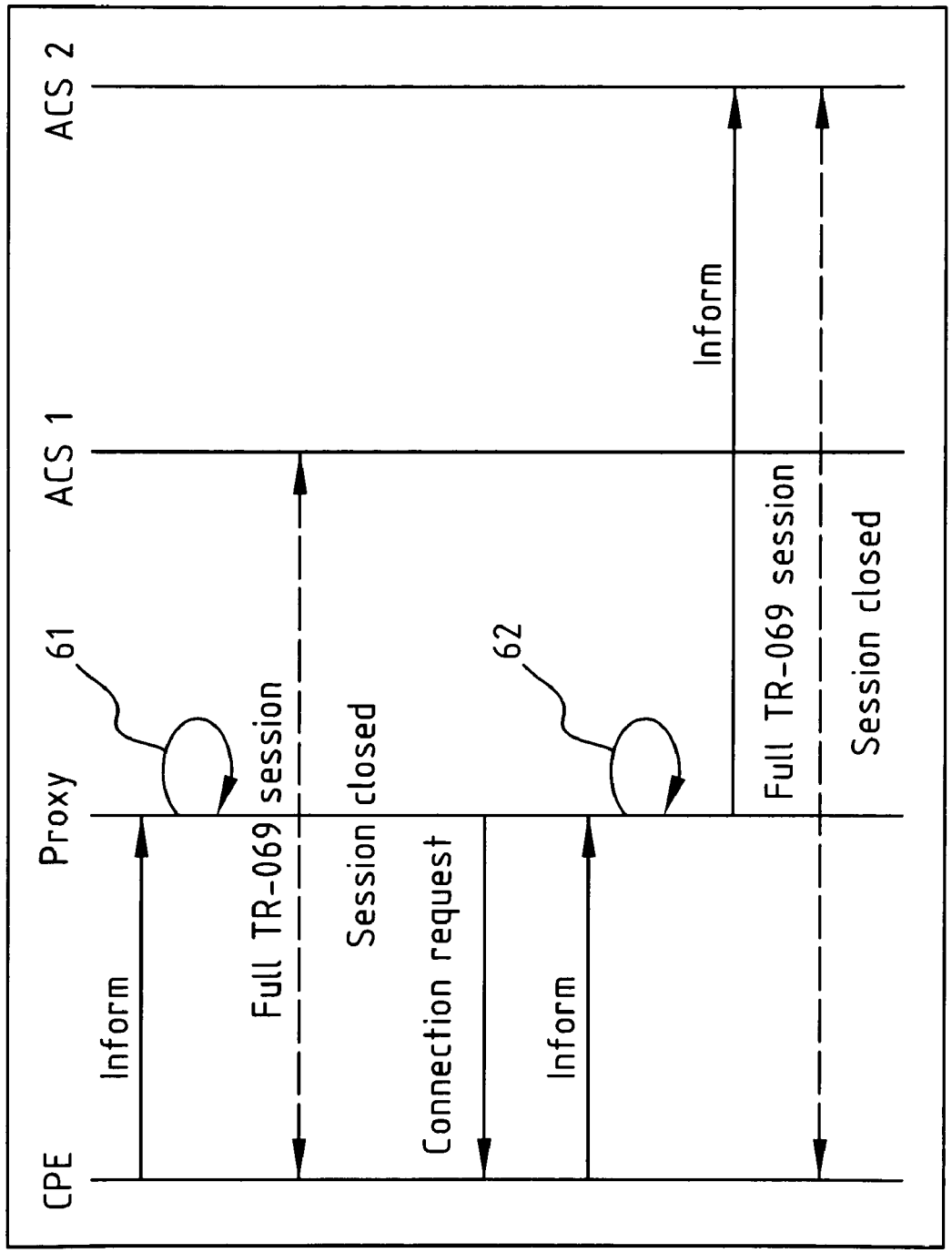
FIG. 5 illustrates elements of the call flow between CPE, proxy, a first ACS and a second ACS according to embodiments of the present invention, relating to the "Active or Passive Notification" scenario as explained in TR-069 v1.1 and possibly earlier versions as would be recognised by the person of ordinary skill.

Another scenario according to the TR-069 specification and further modified according to embodiments of the present invention, relating to the "active or passive notification", is shown in FIG. 5. Here the inform message coming from the CPE towards the proxy contains the changed parameters in the parameter area of the inform message. The proxy has to provide these parameters to the appropriate ACS. After having initiated a TR-069 session to the proxy by sending a new inform message, the proxy snoops the inform messages, and stores a local copy of the parameter list (61). Afterwards it forwards this session to the first ACS and keeps monitoring it. After the TR-069 session is closed, the proxy sends a connection request to the CPE. The CPE then restarts a session to the proxy, sending an inform message. The proxy then adds these parameters to the parameter list of the inform message (62), and forwards it to the next ACS (ACS 2). In case there are more than two ACS's, for instance three, or a priori any number of ACS's, the proxy can repeat this procedure for each of these ACS's.

Another scenario according to TR-069 and further modified according to the embodiments of the present invention, relating to the "connection request" can be the following: since the CPE can indicate only one ACS the proxy can be used to proxy the connection request from the different ACS's, as for instance ACS 1 and ACS 2. The connection request for a particular CPE can be of the form "http://host:port/CPE?hostURL=http%3A%2F%2Fa.b.c.d%3A80", where "host:port" is the IP address/port of the proxy server. Thus, the ACS will send an HTTP GET message to the proxy server to request the connection. The proxy server then extracts the value of the parameter 'host URL' (for instance http://a.b.c.d:80), and uses this to identify the CPE. The proxy server sends the HTTP GET to the CPE.

Further typical scenarios possibly described in the technical report TR-069 may also be provided and applied according to embodiments of the present invention, mutatis mutandis.

Moreover, the call flows are provided for illustrative purposes, and may not be complete as they are intended to illustrate certain but possibly not all aspects, which would be recognized to the person of ordinary skill.

While the principles of the invention have been set out above in connection with specific embodiments, it is to be clearly understood that this description is merely made by way of example and not as a limitation of the scope of protection which is determined by the appended claims.

The invention claimed is:

1. A system for automatically configuring a device, said system comprising:
    a first automatic configuration server, configured to communicate with said device and configured to automatically configure at least a first part of the configurable parameters of a data model of said device using a remote management protocol (RMP);
    a proxy server communicatively coupled between said device and said automatic configuration server; and
    a second automatic configuration server configured to communicate with said device and for automatically configuring at least a second part of the configurable parameters of the data model of said device, said proxy server communicatively coupled between said device and said second automatic configuration server, each of said first automatic configuration server and said second automatic configuration server configures a different set of configurable parameters of the data model, wherein said proxy server is configured to,
    set up subsequent RMP sessions between said device and each of said plurality of automatic configuration servers, each session automatically configuring a predetermined part of said data model of said device,
    monitor each of said plurality of RMP sessions at a location between the device and one or more automatic configuration servers to acquire session information, and direct each of said plurality of RMP sessions to a corresponding automatic configuration server of said one or more automatic configuration servers based on said session information.

2. A system according to claim 1, wherein said proxy server is configured to monitor RMP sessions for said CPE to acquire session information.

3. A system according to claim 2, wherein said proxy server is configured to communicate with at least two automatic configuration servers based on a set of rules and said TR-069 session information.

4. A system according to claim 3, wherein said proxy server is configured to communicate with predetermined automatic configuration servers to manage respective predetermined parts of the data model.

5. A proxy server configured to intercept a remote management protocol (RMP) session message communicated between a device and at least a first automatic configuration server and a second automatic configuration server, the proxy server comprising:
   a processor configured to,
   set up subsequent RMP sessions between said device and each of at least said first automatic configuration server and said second automatic configuration server, each RMP session being associated with one of said first automatic configuration server and said second automatic configuration server, each RMP session automatically configuring a part of a data model associated with said device and each of said first automatic configuration server and said second automatic configuration server configures a different part of the data model,
   monitor each of said RMP sessions at a location between the device and each of at least said first automatic configuration server and said second automatic configuration server to acquire session information, and
   direct each of said RMP sessions to a corresponding automatic configuration server of said first automatic configuration server and said second automatic configuration server based on said session information.

6. The proxy server according to claim 5, wherein said processor is further configured to communicate with at least two automatic configuration servers based on a set of rules and said RMP session information.

7. A proxy server according to claim 6, wherein said processor is further configured to communicate with predetermined automatic configuration servers to manage respective predetermined parts of the data model of said device.

8. The proxy server of claim 5, wherein said RMP session is associated with a customer premises equipment (CPE) wide area network (WAN) (CWMP) management protocol as defined in TR-069 of the DSL Forum.

9. A method for automatically configuring a device such that a data model of said device is managed by a plurality of automatic configuration servers, the method comprising;
   setting up subsequent remote management protocol (RMP) sessions between said device and each of said plurality of automatic configuration servers, each RMP session being associated with one of said plurality of automatic configuration servers, each RMP session automatically configuring a part of said data model of said device and each of said plurality of automatic configuration servers configures a different part of the data model;
   monitoring each of said RMP sessions at a location between the device and the plurality of automatic configuration servers acquiring session information;
   directing each of said RMP sessions to a corresponding automatic configuration server of said plurality of configuration servers based on at least said session information.

10. Method according to claim 9, wherein directing is further based on a predetermined set of rules.

11. The method of claim 9, wherein said RMP session is associated with a customer premises equipment (CPE) wide area network (WAN) (CWMP) management protocol as defined in TR-069 of the DSL Forum.

12. The method of claim 9, wherein said monitoring of said RMP sessions is associated with an access provider network.

13. The method of claim 9, wherein said monitoring of said RMP sessions is associated with a home gateway.

* * * * *